June 5, 1928.

A. FELTON

POWER LAWN MOWER

Filed July 15, 1926    2 Sheets-Sheet 1

Inventor
Andrew Felton
by Hazard and Miller
Attorneys

June 5, 1928.
A. FELTON
1,672,250
POWER LAWN MOWER
Filed July 15, 1926 2 Sheets-Sheet 2
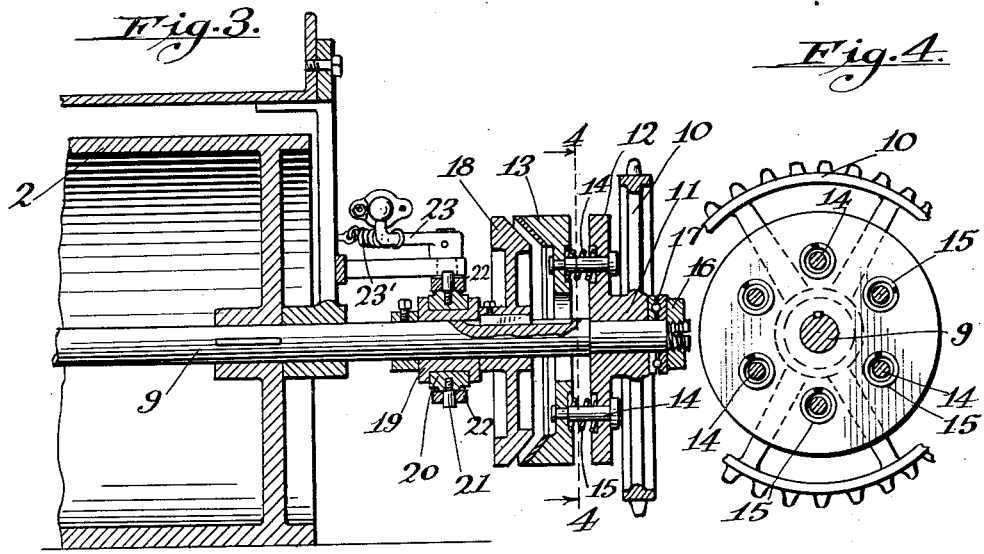
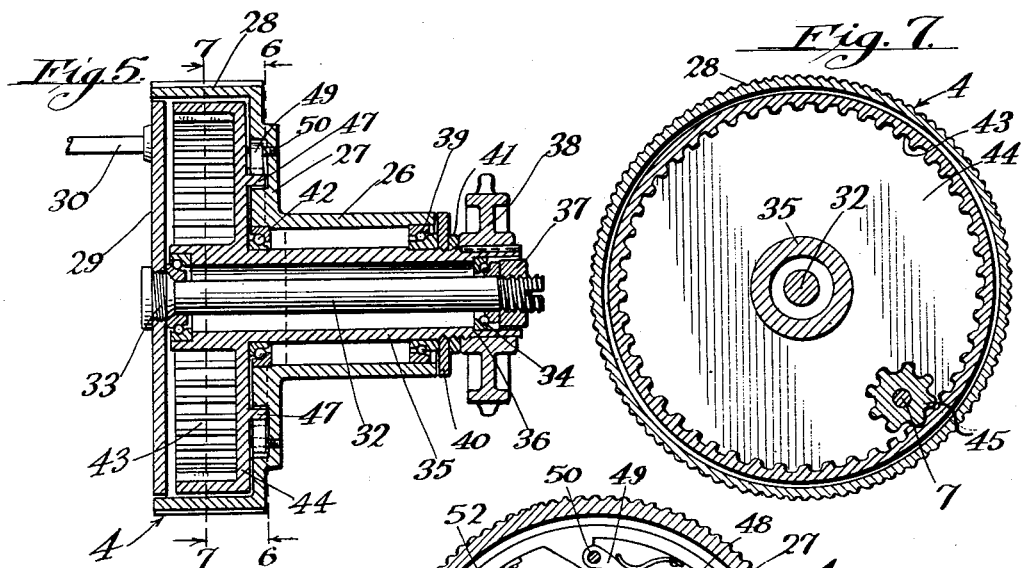
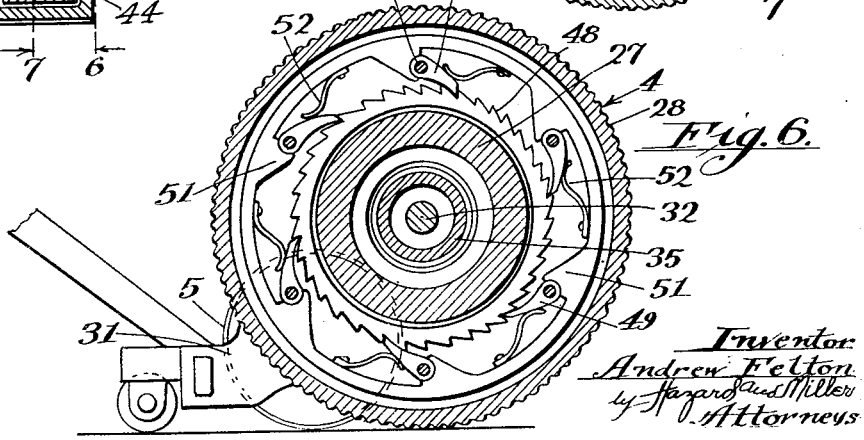
Inventor
Andrew Felton
by Hazard and Miller
Attorneys Patented June 5, 1928.

1,672,250

UNITED STATES PATENT OFFICE.

ANDREW FELTON, OF LOS ANGELES, CALIFORNIA.

POWER LAWN MOWER.

Application filed July 15, 1926. Serial No. 122,574.

My invention is a power lawn mower to give a movable speed to the cutter, the drive being either direct from the wheels contacting with the ground or from a roller through gearing to increase the speed.

Some of the difficulties in cutting lawns with power lawn mowers arise in that where the cutting blades are driven from wheels operatively connected to the cutter, that sometimes this drive is insufficient to properly cut the grass, particularly if it should be wet or matted. An object of my invention is to overcome this difficulty by rotating the cutters when desired at higher speed than their normal rate so that where the cutting is difficult or close cutting is required the step up speed mechanism may be utilized and then when desired the rate of speed may be shifted back to the normal or usual speed. By this procedure the cutting blades are saved the excessive wear of being continuously power driven at a higher rate of speed than normal.

Another object of my invention is to transmit the motion for the higher speed for the cutters from the usual roller or drum forming part of power lawn mower and having a large contacting surface with the ground, this drum being connected through a clutch and a system of gearing with the cutter driving mechanism.

In constructing my invention I preferably provide the longitudinal drum or roller with a shaft longer than usual and mount a sprocket wheel loosely on the end of this shaft with one element of the clutch connected thereto. The shaft is also provided with a clutch element which may be manually operated to coact with the free clutch element and thus drive the sprocket as desired.

The usual cutter driving wheels which roll on the lawn are provided with an internally mounted sleeve having a large internal gear thereon. This sleeve is rotated in one direction in the driving wheels and restrained from motion in the other direction by pawls or the like. The sleeve is provided with a sprocket over which a sprocket chain from the sprocket wheel on the drum shaft is trained, thereby transmitting motion direct to the sleeve and its internal gear when the clutch is closed. This internal gear by means of a pinion operates the rotating cutters of the power lawn mower in the ordinary manner. When, however, the clutch is open the main driving wheels rotate the sleeve and its internal gear by means of the pawls and cause the grass cutters to rotate at their normal speed.

My invention will be more readily understood from the following description and drawings, in which;

Fig. 3 is a transverse section on the line 3—3 of Fig. 2, in the direction of the arrows, showing the roller drum, the clutch and large sprocket mounted thereon;

Fig. 4 is a transverse section on the line 4—4 of Fig. 3 in the direction of the arrows, showing part of the clutch and large sprocket;

Fig. 5 is a transverse section on the line 5—5 of Fig. 2 in the direction of the arrows, showing the driving wheels, the sleeve with its internal gear mounted therein and the small sprocket on the sleeve;

Fig. 6 is a section on the line 6—6 of Fig. 5, in the direction of the arrows, indicating the direct driving pawls for driving from the driving wheels;

Fig. 7 is a section on the line 7—7 of Fig. 5 in the direction of the arrows, showing the internal gear of the sleeve and the driving pinion for the cutters.

Figure 1:
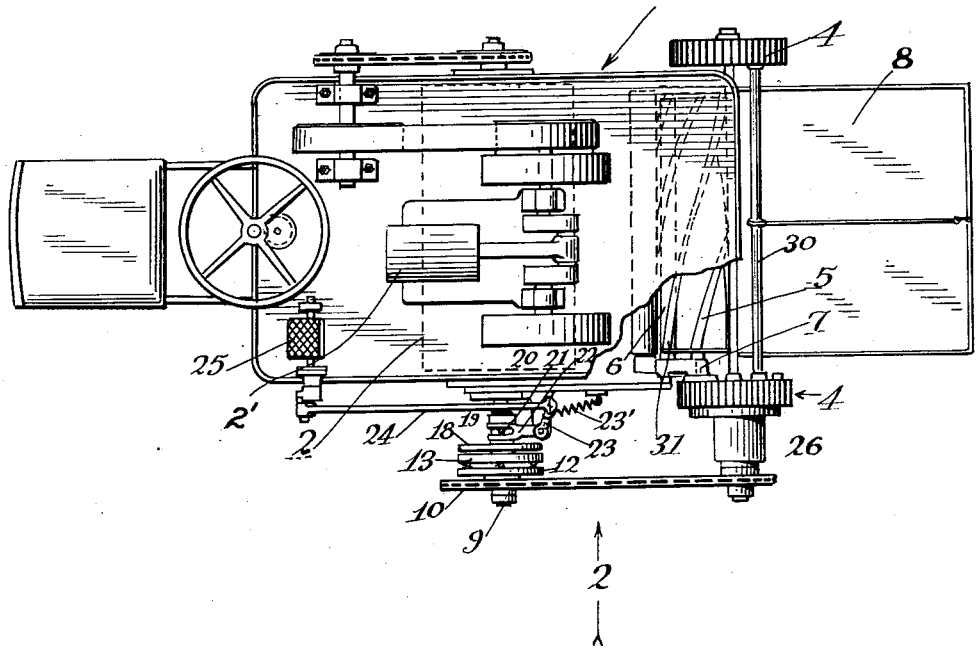
Figure 1 is a plan view of a power lawn mower with my speed up connection attached thereto.

The power lawn mower is designated generally by the numeral 1 having a large roller or drum 2 operated by an engine 2' which normally is designed to carry most of the weight of the mechanism. This roller is generally of large size and extends from side to side of the machine. A steering wheel 3 which usually has a broad face also supports part of the weight.

The driving wheels 4 which operate the rotary grass cutter 5 in the usual manner carry very little of the weight and rely on their frictional engagement with the lawn to rotate the cutters. These cutters operate against a fixed cutter bar 6 in the usual manner and are driven by a cutter spindle 7 in the manner hereunder set forth. As is the common practice I mount a grass catcher 8 on the front of the machine but this forms no part of my immediate invention.

Figure 2:
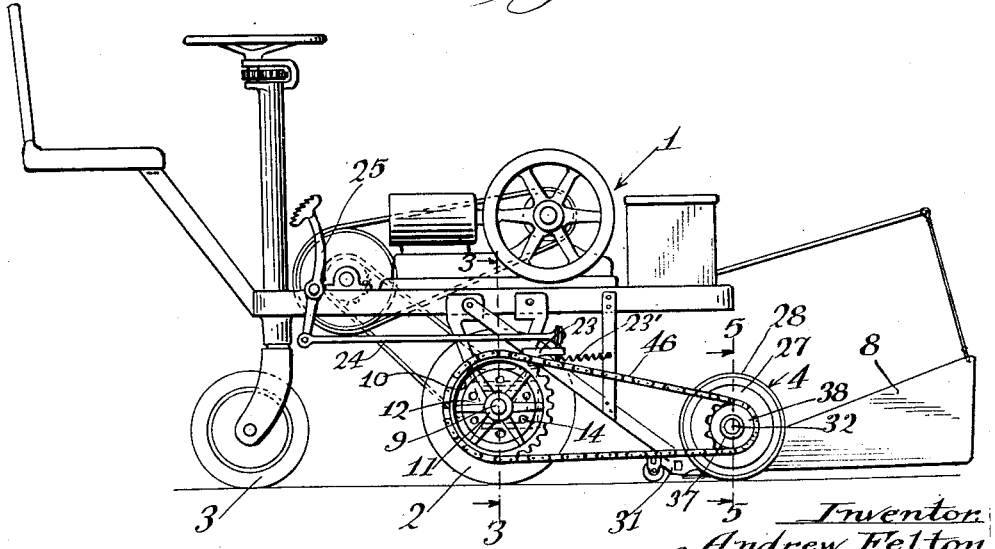
Fig. 2 is a side elevation taken in the direction of the arrow 2 of Fig. 1.

The part of my invention connected with the roller drum 2 is substantially as follows, being illustrated particularly in Figs. 1, 2 and 3:

The drum shaft 9 is made longer than usual and on the end carries a loosely rotatable large sprocket wheel 10, this having a hub 11 with an integral disc 12. The shaft carries one element of the clutch 13 slidably keyed thereon, rotatable on the shaft and being connected to the disc by means of bolts 14 having springs 15 coiled thereabout, separating the disc and the clutch element to give a resilient action as hereunder mentioned. The sprocket gear is held on the shaft by means of a nut 16 and preferably has an anti-friction thrust bearing 17 between the nut and the hub.

A sliding clutch element 18 is keyed on the shaft and has a collar 19 connected thereto. This collar has a ring 20 mounted therein with pins 21 on opposite sides, these pins engaging a yoke 22 of a bell crank 23 having a spring 23' connected thereto and to the frame of the mower, this latter being operated by a link 24 which connects with a clutch pedal 25. Thus by pressing on the pedal the link moves the sliding clutch element against the clutch element 13, transmitting motion through the medium of the disc 12 to the large sprocket 10.

The construction of the driving wheel and the high speed driving gear therein is substantially as follows, having reference particularly to Figs. 1, 2, 5, 6 and 7;

One of the driving wheels 4 has a hollow hub 26 and a disc-like radial portion 27 connecting with the periphery 28 which rolls on the ground. The usual stationary plate structure 29 having a brace rod 30 and connected by a bar 31 to the cutter bar, is held in a fixed position. A spindle 32 is secured to the plate 29 and preferably with a screw threaded connection 33 and by means of the anti-friction bearings 34 carries a cylindrical sleeve 35. This is held in position by a shoulder 36 and by means of the nut 37 engaging one of the anti-friction bearings.

A small sprocket 38 is keyed on the outer end of the sleeve and anti-friction bearings 39 allow the sleeve and the hub 26 to have relative rotary movement, these being held in proper spaced relation by means of a ring 40, a lock nut 41 and the shoulder 42 engaging one of the anti-friction bearings 39.

The sleeve has a large internal gear 43, there being a radial web 44 extending from the sleeve proper and having the internal teeth parallel to the spindle 32. A pinion 45 having the cutter spindle 7 connected thereto meshes with the teeth 43 and transmits the rotary motion to the cutter. A sprocket chain 46 connects the large sprocket wheel 10 and the small sprocket 38, thereby transmitting motion from the drum shaft 9 to the sleeve 35. The sleeve drives the cutter as above mentioned, thereby rotating this at a higher rate of speed than normal. This speed may be graduated in accordance with the relative size of the sprockets and if desired intermediate gearing may be utilized to speed the cutters to any desired extent. Intermediate gearing has been omitted for the sake of simplicity of design.

The direct drive from the wheels 4 is substantially as follows:

The web 44 has a flange 47 with internal ratchet teeth 48, these teeth engaging pawls 49 mounted on pins 50, these latter being secured to the radial portion 27 of the driving wheels. Preferably the pin connection to the pawls is slightly loose so that the pawls may thrust back against the abutment blocks 51 forming an integral part of this radial portion.

Springs 52 normally press the pawls into engagement with the ratchet teeth. Therefore when the clutch is open and there is no mechanical drive between the drum shaft and the sleeve 35 the driving wheels 4 through the medium of the pawls 49 rotate the sleeve at the same speed as the driving wheels, this sleeve operating the cutting knives as above described through the medium of the pinion 45.

From the above description it will be seen that I have devised a power lawn mower in which by the changes and additions on known types of mowers, the speed of the cutting knives may be materially increased from that ordinarily had through the driving wheels and that this high speed may be operated as desired, by merely closing or opening the clutch It will be apparent that the manner of actuating the cutters at a higher speed than the ordinary driving mechanism could be materially changed to suit different types of power lawn mowers now on the market, or be incorporated as an integral part of a lawn mower. Such changes would be within the spirit of my invention.

Having described my invention, what I claim is:

1. A power lawn mower comprising in combination a drum engaging the ground, a rotating cutter, driving wheels engaging the ground, and means for operating the cutter from the driving wheels or from the drum.

2. In a power lawn mower having a power mechanism, a drum engaging the ground partly supporting the power mechanism, driving wheels engaging the ground, a rotary cutter having a pinion for rotating same, a gear meshing with the pinion, and means to drive the gear from a driving wheel or from the drum.

3. In a power lawn mower, a drum engaging the ground having a shaft, a rotary cutter, driving wheels engaging the ground, a pinion to operate the cutter, a gear meshing with the pinion, means for transmitting motion from the drum shaft to the said gear, means to disengage the said motion transmitting mechanism, and means to transmit rotary motion from the driving wheels to the said gear.

4. A power lawn mower comprising in combination a drum engaging the ground having a shaft, a clutch on said shaft, a rotary cutter having a pinion, a gear meshing with the pinion, a gear system for transmitting power between the drum shaft and the said gear, said gear system being controlled by the said clutch, driving wheels engaging the ground, and means to transmit rotary motion from the driving wheels to the said gear.

5. A power lawn mower comprising in combination a driving wheel, a gear housed in said wheel, a pinion meshing with said gear, a rotary cutter driven by the pinion, means to transmit rotary motion from a driving wheel to the said gear at the same speed as that of the driving wheel, and means to rotate the said gear at a higher speed than the driving wheel.

6. A power lawn mower as claimed in claim 5, in which the means to transmit the motion at a higher speed comprises a gear system connected to a rotating part of the power lawn mower, and means to engage and disengage the transmission of said motion.

7. A power lawn mower comprising in combination a driving wheel having a hub, a gear having a sleeve mounted within the driving wheel and the hub, a rotary cutter having a pinion for driving same, meshing with the said gear, means for transmitting motion from the driving wheel to the said gear at the same speed as the rotation of the wheel, and means to rotate said gear at higher speed than the driving wheel operated from another part of the machine.

8. A power lawn mower as claimed in claim 7, in which the means to drive the gear at higher speed comprises a sprocket mounted on the sleeve, a sprocket chain meshing therewith, a shaft normally rotated, having a sprocket gear thereon, and a clutch for connecting the said sprocket gear with the said shaft when desired.

9. A power lawn mower as claimed in claim 8, the said shaft being operatively connected with a drum, the drum forming a supporting structure for part of the power lawn mower.

10. A power lawn mower comprising in combination a stationary plate, a spindle connected to said plate, a sleeve having an internal gear rotatable on the spindle, a pinion meshing with said gear, a rotary cutter operated from the pinion, a driving wheel having a hub rotatable on the said sleeve, a pawl and ratchet connection between the driving wheel and the said gear to rotate said gear at the same speed as the driving wheel from the driving wheel, and means operated from another part of the lawn mower to rotate the sleeve and the said gear at higher speed than the driving wheel.

11. A power lawn mower as claimed in claim 10, in which the means to rotate the sleeve and the gear at a higher speed comprises a drum having a shaft, the drum supporting part of the power machine, a sprocket gear on the drum shaft, a sprocket on the sleeve, and a sprocket chain connecting the gear and the sprocket.

12. A power lawn mower as claimed in claim 11, having a clutch mounted on the drum shaft operatively connected to the sprocket gear to drive said gear at the same rate as the shaft when desired, or to disconnect said gear from the shaft.

13. In a power lawn mower comprising in combination a driving wheel having an enlarged hub, a radial portion extending outwardly from the hub, a peripheral portion to engage the ground, a sleeve rotatably mounted internally of the hub and having anti-friction bearings between the sleeves and the hub, the sleeve having a radial web and an internal gear connected to the web, a fixed plate having a spindle, anti-friction bearings between the spindle and the sleeve, a pinion meshing with the gear, a rotary cutter driven by the pinion, a sprocket on the sleeve, a series of ratchet teeth formed on part of the radial web, dogs mounted on the radial portion of the driving wheel forming means to transmit rotary motion to the said gear at the same speed of rotation as the driving wheel, and means to rotate the sprocket and hence the gear at a higher speed than the driving wheel.

14. In a power lawn mower having a power mechanism, a drum supporting part of the power mechanism, a shaft connected to said drum, a sprocket gear loosely rotatable on the shaft having a clutch element connected thereto, a complementary clutch element keyed to the shaft and slidably mounted thereon, a foot pedal having means connecting same to the clutch to operate said clutch, a rotary cutter, driving wheels, means normally rotating the cutter from the driving wheels, and means to transmit motion from the sprocket to the cutter.

In testimony whereof I have signed my name to this specification.

ANDREW FELTON.